May 5, 1964 C. W. MOTT, JR 3,131,572
BELT DRIVE ASSEMBLY
Filed March 2, 1962 2 Sheets-Sheet 1
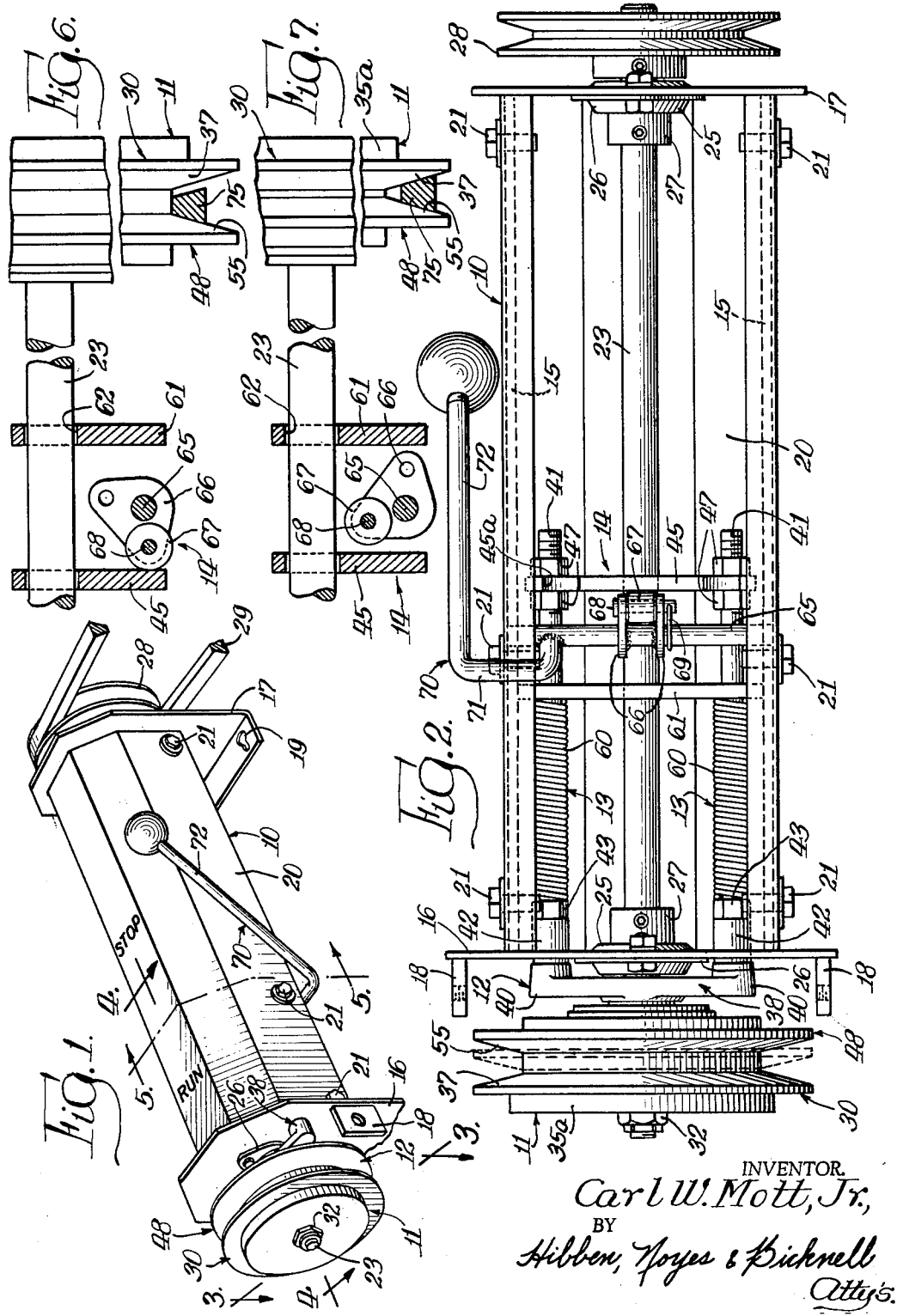
INVENTOR.
Carl W. Mott, Jr.,
BY
Hibben, Noyes & Bicknell
Atty's.

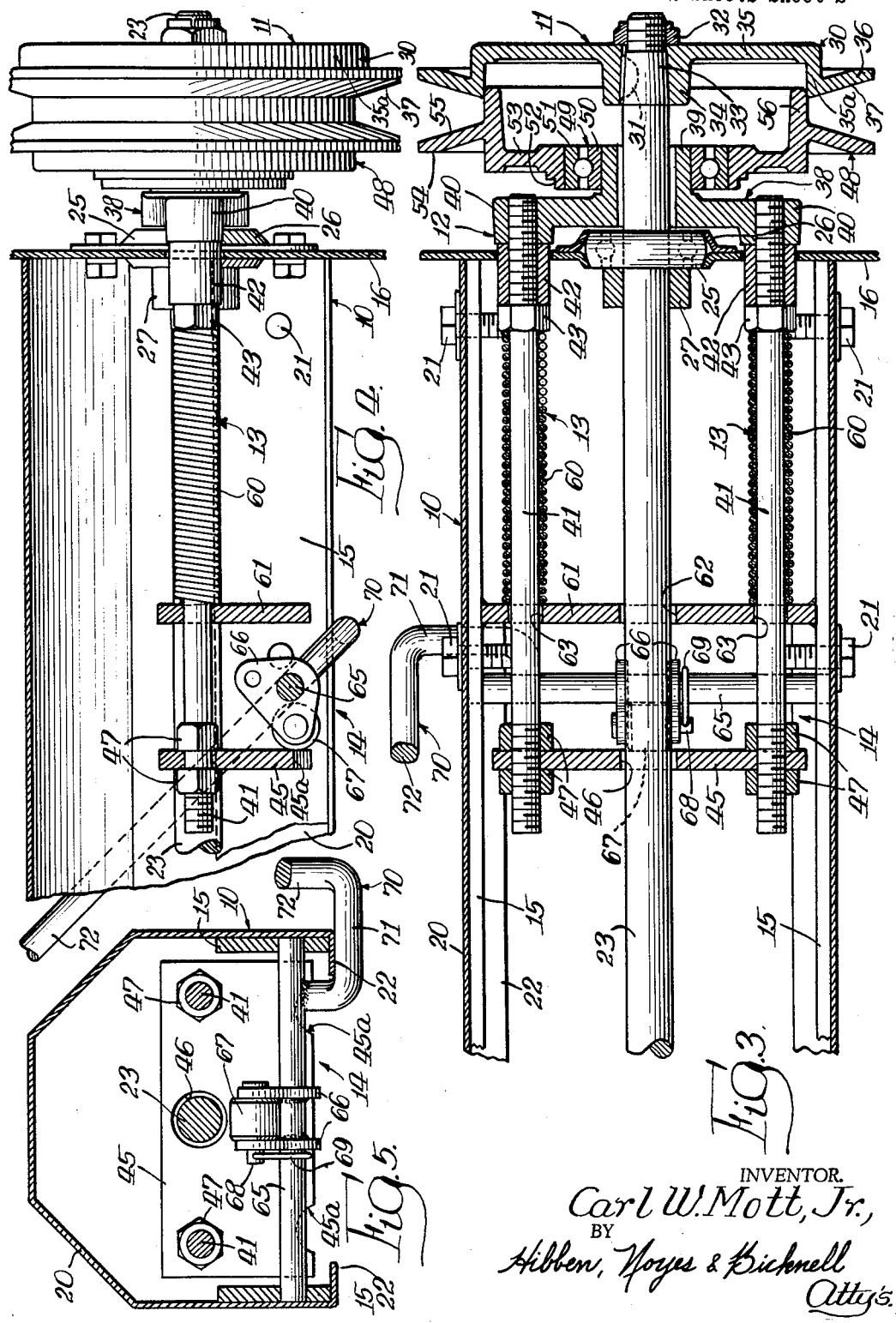

United States Patent Office 3,131,572
Patented May 5, 1964

3,131,572
BELT DRIVE ASSEMBLY
Carl W. Mott, Jr., Western Springs, Ill., assignor to Mott Corporation, La Grange, Ill., a corporation of Illinois
Filed Mar. 2, 1962, Ser. No. 176,995
16 Claims. (Cl. 74—230.17)

This invention relates generally to belt drives and, more particularly, to an improved drive assembly for a V-belt.

It is a primary object of this invention to provide a V-belt drive assembly that may be manually shifted into or out of driving relation with the belt, when desired.

It is another object to provide a drive assembly of the foregoing character that may engage the belt with substantially constant force regardless of the amount of load on the belt.

Still another object is to provide a drive assembly of the foregoing character that automatically compensates for stretch of the belt.

A still further object is to provide an assembly of the foregoing character that is sturdy and reliable, and acts as both a clutch and a V-belt drive for a machine such as a lawn mower.

Other objects and advantages of the invention will become apparent from the following description taken in conjunction with the accompanying figures of the drawings in which:

FIG. 1 is a perspective view of a drive assembly embodying the invention;

FIG. 2 is a bottom plan view of the assembly;

FIG. 3 is a fragmentary horizontal sectional view taken on the line 3—3 of FIG. 1;

FIG. 4 is a fragmentary vertical sectional view partially in elevation and taken on the line 4—4 of FIG. 1;

FIG. 5 is a cross sectional view taken on the line 5—5 of FIG. 1; and

FIGS. 6 and 7 are fragmentary views respectively showing the parts in non-driving and drive relation with the belt.

Generally, an assembly embodying the invention comprises a frame and two pulley halves coaxially mounted on the frame. Both pulley halves are rotatably mounted relative to the frame and to each other, and one half is prevented from axial movement while the other half is permitted limited axial movement. The two halves have conical surfaces which together form a belt receiving groove, the axial width of the groove varying upon axial movement of the half mounted for such movement. The axially stationary half is adapted to be connected to a drive such as an engine, and the axially movable half is connected to a biasing means which urges it toward the other half and to a manual shift mechanism for moving the movable half axially away from the other half against the action of the biasing means.

In greater detail, FIGS. 1 to 4 illustrate a belt drive assembly comprising a frame indicated generally by the numeral 10, a drive or axially stationary structure indicated generally by the numeral 11, an adjusting or axially movable structure indicated generally by the numeral 12, a biasing means indicated generally by the numeral 13, and a shift mechanism indicated generally by the numeral 14. The frame 10 comprises two axially extending bars 15 each having one end secured as by welding to a front plate 16 and the other end secured as by welding to a back plate 17. A plurality of lugs 18 may be provided on the front plate 16 and a plurality of holes 19 may be provided in a flange formed on the back plates 17 for the purpose of mounting the assembly on a stable platform or on a machine such as a lawn mower. A shield 20 is secured as by a plurality of bolts 21 to the bars, the shield 20 enclosing the two sides and the top of the portion of the assembly between the two plates 16 and 17. The two axially extending edges of the shield 20 are turned inwardly to form flanges 22, best shown in FIG. 5, which underlie the bottom edges of the bars 15.

The drive structure 11 includes a drive shaft 23 rotatably supported in bearings 25 mounted in the front and back plates 16 and 17. These bearings are preferably ball bearings which have their outer races secured to the plates 16 and 17 by collars 26, FIGS. 3 and 4, and their inner races secured to the shaft 23 by sleeves 27, the bearings preventing axial movement of the shaft. On the rearward end of the shaft is secured a pulley 28 that may be driven by a V-belt 29 connected to a prime mover (not shown). A pulley half 30 is rigidly secured to the tapered forward end 33 of the shaft 23 by a key 31, FIG. 3, and a nut 32 threaded on the end of the shaft, the pulley half 30 thus being held against axial movement relative to the shaft. The pulley half 30 comprises a hub 34, FIG. 5, a web 35 having an axially directed flange 35a and an outwardly turned flange 36 at its outer periphery forming a rearwardly facing conical surface 37.

The adjusting structure 12 comprises a pulley arm 38 mounted on the frame for axial movement, but permitting the shaft 23 to rotate therein. The pulley arm 38 includes a central hub 39, FIG. 3, positioned around the drive shaft 23, but spaced therefrom, and two bosses 40 on the ends of the arm. Threaded holes are formed in the two bosses 40 to receive the ends of two shift rods 41. These two rods 41 extend axially rearward through two holes formed in the front plate 16, a sleeve 42 being mounted on each rod 41 and extending through the hole. The sleeves 42 are held against axial movement relative to the rods by nuts 43, and the holes in the front plate 16 and the sleeves 42 are sized to permit axial movement of the sleeves within the holes.

The adjusting mechanism 12 further includes a cam plate 45 secured to the rearward ends of the rods 41. The plate has a relatively large center hole 46, FIGS. 3 and 5, through which the drive shaft 23 extends, and two side holes positioned to receive the two shift rods 41. Two nuts 47 threaded on each rod 41 on opposite sides of the cam plate 45 secure the rods 41 to the plate 45. As can be seen in FIG. 3, the ends of the cam plate 45 do not engage the bars 15 and the center hole 46 is larger than the diameter of the drive shaft 23, thereby permitting axial movement of the plate 45, the rods 41 and the pulley arm 38.

The adjusting structure 12 still further includes a second pulley half 48 rotatably mounted on the hub 39 of the pulley arm 38 coaxially with and adjacent to the other pulley half 30. A ball bearing 49, FIG. 3, has its inner race 50 secured on the hub 39 and its outer race 51 secured within a hub 52 on the pulley half 48. This pulley half 48 further includes a web 53 having an axially directed flange 56 and a peripheral flange 54 forming a forwardly facing conical surface 55. The flange 56 telescopes within the flange 35a of the first mentioned pulley half 30. The two conical surfaces 37 and 55 thus together form a V-belt receiving groove therebetween, the axial width of which varies upon axial movement of the adjusting structure 12 with the pulley half 48.

The biasing means 13 comprises two compression springs 60 and an abutment plate 61. The plate 61 extends laterally of the frame 10 and is secured at its ends as by welding to the bars 15 of the frame. A center hole 62 and two side holes 53, FIG. 3, are formed in the plate 61 to receive the drive shaft 23 and the two shift rods 41, respectively, and are sized to permit axial movement of the shaft and the rods relative to the plate 61. The two compression springs 60 are positioned around the shift rods 41 and each bears at one end against the abutment plate 61 and at the other end against a nut 43. Since the abutment plate 61 is fixed to the frame 10, it is apparent that the springs 60 urge the adjusting structure 12, which includes the pulley half 48, axially forward toward the pulley half 30 of the drive structure 11, thereby tending to reduce the axial width of the belt receiving groove.

The shift mechanism 14 is adapted to force the adjusting structure 12 rearwardly against the action of the springs 60 and thereby increase the axial width of the belt receiving groove. This mechanism 14 comprises a laterally extending cam rod 65 rotatably mounted in holes formed in the two bars 15 of the frame 10. The ends of the cam rod 65 bear loosely against the shield 20 which prevents endwise movement of the cam rod 65. Two substantially triangular cam brackets 66 are secured as by welding in spaced apart relation on the cam rod 65. A hole for the cam rod 65 is formed adjacent one corner of each bracket 66, and smaller holes are formed adjacent the two remaining corners of each bracket. A cam roller 67 is rotatably mounted between the two cam brackets 66 by a headed pin 68 that extends through one of the smaller holes of each bracket 66, and a cotter pin or wire 69 in the end of the pin 68 holds the pin in place. A substantially L-shaped handle or lever 70 is provided to manually rotate the cam rod 65. One arm 71 of the lever 70 extends under one lower edge of the shield 20 and is turned upwardly at its inner end and secured as by welding to the cam rod 65 as shown in FIG. 5. The longer arm 72 of the lever 70 extends upwardly outside of the shield 20 and may be swung between a run position and a stop position. In both positions the shorter arm 71 of the lever 70 is adapted to bear against the adjacent flange 22 of the shield 20 and to limit further pivotal movement. In the event it is desired to have the lever 70 on the opposite side of the frame 10, the cam rod 65 is turned end-to-end and the pin 68 and cam roller 67 are mounted in the other small hole in each cam bracket 66. As shown in FIG. 5, a portion, indicated generally by the numeral 45a, of the cam plate 45 adjacent each end may be recessed to provide clearance for the lever 70 when it is in the run position.

As shown in FIGS. 4 to 7, the cam rod 65 is positioned relative to the cam plate 45 such that the cam roller 67 may constantly bear against the plate 45. When the lever 70 is in the stop position, the cam roller 67 and the plate 45 extend generally rearwardly from the cam rod 65 as shown in FIGS. 4 and 6. However, in this position, the cam roller 67 is slightly below a line from the axis of the cam rod 65 perpendicular to the plate 45, so that the force exerted by the plate 45 against the cam roller 67, caused by the compression springs 60, tends to rotate the cam rod 65 in the counter clockwise direction as seen in FIGS. 4 and 6. Such rotational movement is prevented, however, by the shorter arm 71 of the lever 70 which bears against the adjacent flange 22 of the shield 20, with the result that the plate 45 is held in the rearward position. The pulley half 48 is also displaced rearwardly and held in such position due to the connection between the plate and the pulley half, and the axial width of the belt receiving groove has a maximum dimension as shown in FIG. 6.

As the lever 70 is pivoted from the stop position to the run position, the cam roller 67 permits the plate 45 to move axially forward, due to the action of the compression springs 60. The axial width of the belt receiving groove is simultaneously reduced. When a V-belt 75, FIGS. 6 and 7, is positioned in the groove it is compressed slightly and forced radially outward until the belt is tight. When the drive shaft 23 and the pulley half 30 are rotated by a suitable prime mover, not shown, the frictional engagement between the belt 75 and the pulley half 30 causes the belt to be driven and the pulley half 48 to rotate also.

Under usual operating conditions, the belt 75 will become tight and prevent further axially forward movement of the cam plate 45 and the pulley half 48 before the plate 45 reaches its extreme forward position. The force of the compression springs 60 is exerted against the belt 75 and not the cam roller 67 as shown in FIG. 7. As the belt 75 gradually stretches during use it moves radially outward in the groove, and the springs 60 move the pulley half 48 forward and reduce the axial width of the groove, thereby maintaining a tight grip on the belt 75 and acting as an automatic belt tightener. Excessive forward movement of the pulley half 48 and the plate 45 is prevented, however, by the cam roller 67 and the shorter arm 71 of the lever 70 which bears against the flange 22 of the shield 20.

When the V-belt 75 is in the groove and the lever 70 is returned to the stop position, the compressive force on the belt 75 is released and it and the mechanism being driven by the belt stop. In the stop position the belt 75 may rest on the axially extending flange 56 of the pulley half 48. The belt is thus free from the driving half 30 of the pulley.

If desired, the back plate 17 and the pulley 28 may be eliminated and the drive shaft 23 constructed for a direct connection to a prime mover. If the back plate 17 is eliminated, a suitable bar or cross brace (not shown) may be secured, as by welding, to the bars 15 at the rearward end of the frame 10 to maintain rigidity in this area.

From the foregoing description it is apparent that a novel and useful drive assembly for a belt has been provided. The assembly is especially useful in a power driven lawn mower as a coupling between the prime mover and the blades. The assembly may be manually operated to apply power or remove it when desired simply by pivoting the lever. It is capable of handling heavy loads due to the compressive force applied to the belt. Further, the assembly acts as an automatic belt tightener during operation.

I claim:

1. A drive assembly for a belt, comprising coaxial first and second halves respectively having conical surfaces which together form a belt receiving groove, a rotatably mounted shaft supporting said first half, mounting means supporting said second half for rotative and axial movement relative to said first half, axial movement of said second half varying the axial width of said groove, biasing means connected to said mounting means for urging said second half toward said first half, and shifting means connected to said mounting means for moving and holding said second half away from said first half against the action of said biasing means, said biasing means comprising an abutment member that is axially stationary relative to said first half, and at least one compression spring mounted between said mounting means and said abutment member, whereby said spring urges said mounting means and said second half toward said first half, and said shifting means comprising an axially movable plate, and at least one rod having one end secured to said mounting means and the other end secured to said axially movable plate, and cam means for selectively forcing said movable plate axially away from said first half.

2. A drive assembly for a belt, comprising a frame, an axially stationary structure and an axially movable structure, said structures being separately mounted on said frame and out of sliding engagement with each other and each including a pulley half, said pulley halves being coaxial and rotatable relative to each other and having conical surfaces which together form a belt receiving groove, biasing means for urging said movable structure axially to reduce the distance between said pulley halves and the width of said groove, and shifting means for increasing the distance between said pulley halves and the width of said groove against the action of said biasing means.

3. A drive assembly for a belt, comprising first and second pulley halves, means for mounting said first half for rotative movement, means out of frictional engagement with said first named means for mounting said second half coaxially with said first half and adjacent thereto for rotative and axial movement relative to said first half, biasing means coupled to said second half mounting means for urging said second half axially toward said first half, shifting means connected to said second half for moving said second half away from said first half against the action of said biasing means, and means connected to one of said mounting means and adapted to be coupled to a prime mover.

4. A drive assembly as in claim 3, wherein said last named means is connected to said first half.

5. A drive assembly for a belt, comprising a frame, first and second pulley halves, first means for rotatably mounting said first half on said frame, second means out of frictional engagement with said first means for mounting said second half on said frame adjacent to and coaxially with said first half, said second means mounting said second half for rotative and axial movement relative to said first half, biasing means connected to said frame and to said second means for urging said second half axially toward said first half, and shifting means connected to said frame and to said second means and movable between first and second positions, said shifting means being operable to permit said biasing means to urge said second half toward said first half when in said first position, to draw said second half axially away from said first half on movement from said first position to said second position, and to hold said second half away from said first half when in said second position.

6. A drive assembly as in claim 5, wherein said biasing means comprises an abutment on said frame that is axially stationary relative to said first means, and a plurality of compression springs positioned between said second means and said abutment.

7. A drive assembly as in claim 6, wherein said shifting means comprises an axially movable plate, a plurality of axially extending rods each connected at one end to said second means and at the other end to said movable plate, and cam means rotatably mounted on said frame adjacent to and abutting said plate for selectively causing axial movement of said plate.

8. A drive assembly as in claim 7, wherein said rods are positioned through said compression springs.

9. A drive assembly as in claim 7, wherein said cam means comprises a shift rod rotatably mounted on said frame, a bracket secured to said shift rod, a roller rotatably mounted on said bracket and engaging said plate, the axis of rotation of said roller being parallel to and displaced from the axis of rotation of said shift rod, and a lever secured to said shift rod on one side of said frame.

10. A drive assembly as in claim 9, wherein said bracket further includes means for mounting an additional roller for reversing said shift rod to place the lever on the other side of said frame.

11. A drive assembly as in claim 5, wherein said first means comprises a drive shaft secured to said first pulley half and rotatably mounted on said frame, said drive shaft being adapted to be connected to a prime mover, and said second means comprises a pair of rods connected to said second pulley half and mounted for axial movement on said frame.

12. A drive assembly for a belt, comprising a frame, a drive shaft rotatably mounted on said frame, a first pulley half secured to said drive shaft, an arm mounted for axial movement on said frame, said arm having a hub surrounding said drive shaft, a second pulley half rotatably mounted on said hub adjacent to and coaxial with said first pulley half, two axially extending rods secured at one end in the respective ends of said arm, and biasing means for urging said rods and said second pulley half axially toward said first pulley half.

13. A drive assembly as in claim 12, and further including shifting means engageable with said rods at their other ends for moving said arm and said second pulley half axially away from said first pulley half against the action of said biasing means.

14. A drive assembly as in claim 13, wherein said shifting means comprises a manually operable cam mechanism.

15. A drive assembly as in claim 12, wherein said biasing means comprises an abutment member secured to said frame, and a plurality of compression springs positioned around said rods between said abutment member and said arm.

16. A drive assembly for a belt, comprising coaxial first and second halves respectively having conical surfaces which together form a belt receiving groove, a rotatably mounted shaft supporting said first half, mounting means supporting said second half for rotative and axial movement relative to said first half, axial movement of said second half varying the axial width of said groove, biasing means connected to said mounting means for urging said second half toward said first half, and shifting means connected to said mounting means for moving and holding said second half away from said first half against the action of said biasing means, said shifting means comprising an axially movable plate, and at least one rod having one end secured to said mounting means and the other end secured to said axially movable plate, and cam means for selectively forcing said movable plate axially away from said first half.

References Cited in the file of this patent
UNITED STATES PATENTS

| | | |
|---|---|---|
| 2,209,736 | Livingston | July 30, 1940 |
| 2,298,535 | Krag | Oct. 13, 1942 |
| 2,417,914 | Costello | Mar. 25, 1947 |
| 2,678,566 | Oehrle | May 18, 1954 |
| 2,735,308 | Peterson | Feb. 21, 1956 |
| 2,893,253 | Beemer | July 7, 1959 |
| 2,996,934 | White | Aug. 22, 1961 |